(12) United States Patent
Reder et al.

(10) Patent No.: US 6,328,347 B1
(45) Date of Patent: Dec. 11, 2001

(54) UNIFORM AXIAL LOADING GROUND GLASS JOINT CLAMP

(75) Inventors: Steven E. Reder, Boring; Preston E. Pillow, Sandy; William L. Emery, Corvallis, all of OR (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/400,767

(22) Filed: Sep. 22, 1999

(51) Int. Cl.[7] ....................................... F16L 27/04
(52) U.S. Cl. ..................... 285/261; 285/267; 285/268; 285/911
(58) Field of Search ........................... 285/261, 270, 285/271, 268, 269, 267, 911

(56) References Cited

U.S. PATENT DOCUMENTS

| | | | | |
|---|---|---|---|---|
| 733,065 | * | 7/1903 | Martin | 285/267 |
| 999,564 | * | 8/1911 | Inghram | 285/268 |
| 1,884,944 | * | 10/1932 | Williams | 285/271 |
| 2,693,971 | * | 11/1954 | Harrison | 285/269 |
| 3,475,039 | * | 10/1969 | Ortloff | 285/261 |
| 4,442,572 | | 4/1984 | Keck | 24/562 |
| 4,489,962 | * | 12/1984 | Caumont et al. | 285/268 |
| 5,048,873 | * | 9/1991 | Allread et al. | 285/261 |
| 5,215,717 | | 6/1993 | Conant et al. | 422/102 |
| 5,380,596 | | 1/1995 | Yoshida et al. | 428/432 |

FOREIGN PATENT DOCUMENTS

| | | | | |
|---|---|---|---|---|
| 608847 | * | 8/1926 | (FR) | 285/268 |
| 1236037 | * | 6/1960 | (FR) | 285/261 |
| 14126 | * | of 1891 | (GB) | 285/261 |
| 419736 | * | 1/1948 | (IT) | 285/267 |
| WO-90015229 | * | 12/1990 | (WO) | 285/261 |

* cited by examiner

Primary Examiner—Eric K. Nicholson

(57) ABSTRACT

A system for coupling a ball fitting connected to a first tubing to a socket fitting connected to a second tubing. A first coupling forms an aperture having a diameter that is larger than the diameter of the ball fitting, and receives the ball fitting. The first coupling forms an annular race, with an annular surface disposed between the annular race and the aperture. First split ring pieces are assembled into a first ring that forms an aperture having a diameter that is smaller than the diameter of the ball fitting, and receives the first tubing. The first ring forms an annular ridge that engages the annular race, and aligns the first split ring pieces. The annular surface applies uniform axial pressure to a first surface of the first ring. The first ring has a second surface opposing the first surface that applies uniform axial pressure to a back portion of the ball fitting. A second coupling forms an aperture having a diameter that is larger than the diameter of the socket fitting, and receives the socket fitting. The second coupling forms an annular race, with an annular surface disposed between the annular race and the aperture. Second split ring pieces are assembled into a second ring that forms an aperture having a diameter that is smaller than the diameter of the socket fitting, and receives the second tubing. The second ring forms an annular ridge that engages the annular race, and aligns the second split ring pieces. The annular surface applies uniform axial pressure to a first surface of the second ring. The second ring has a second surface opposing the first surface that applies uniform axial pressure to a back portion of the socket fitting. Engagement means reversibly draw the first coupling and the second coupling toward each other, and releasably hold them together with uniform axial pressure.

20 Claims, 8 Drawing Sheets

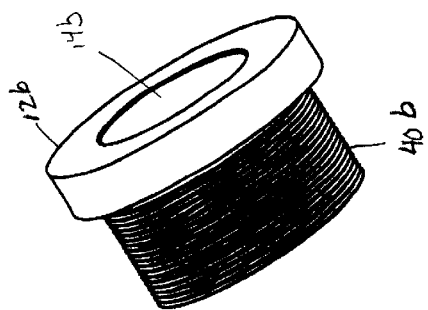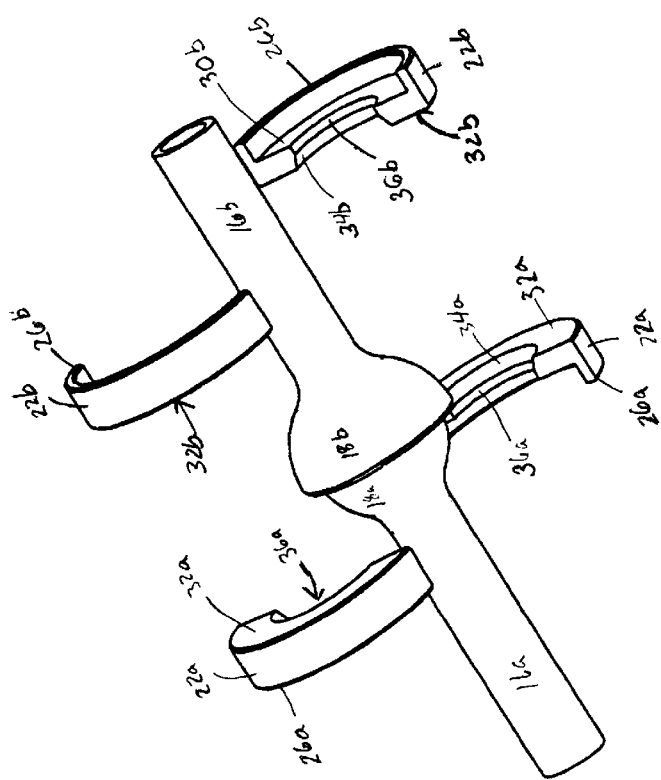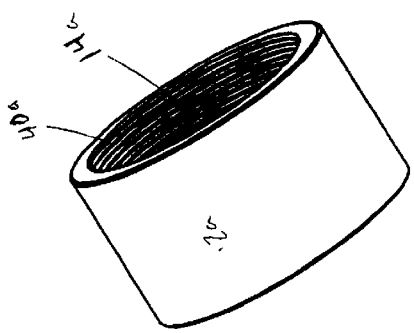

UNIFORM AXIAL LOADING GROUND GLASS JOINT CLAMP

FIELD

This invention relates to couplings. More particularly the invention relates to a system for securing a ball and socket joint for joining glassware, such as quartz, however, the invention can apply to any ball and socket joint.

BACKGROUND

Ground glass joints have been used for years to join separate pieces of glassware. In such joints, the mating surfaces of the pieces to be joined are precision ground to fit closely one against the other, so as to create a joint that is as impermeable as possible.

One particularly useful joint is the ball joint, which is typically used to releasably join two pieces of glass tubing. To create the ball joint, a glass ball is fashioned on the mating end of one of the glass tubes. The exterior surface of the free end of the glass ball is precision ground to create a very uniform surface. A glass socket is fashioned on the mating end of the other glass tube. The interior surface of the free end of the glass socket is also precision ground, to create a uniform surface having a diameter that is only slightly larger than the diameter of the ground glass ball. A joint is created between the two pieces of glass tubing when the ball is fitted within the socket.

One benefit of the ball joint is that the two glass tubes do not have to remain in an axially aligned position relative to each other. This is possible because the ball on the end of the one tube can rotate to a certain degree within the socket on the end of the other tube, while the joint created between the ball and socket remains intact.

Although the precision ground ball and socket fit very well together in the arrangement described above, the joint may not be sufficiently impermeable for all applications. Thus, some type of seal is often placed within the joint in some manner. For example, a small amount of water or vacuum grease can be used to coat the ground surfaces of the ball and socket, which tends to increase the impermeability of the joint for certain applications.

However, sealants of the type mentioned above are inappropriate for other applications. For example, if the joint must be held at or cycled to an elevated temperature, water will tend to evaporate from the joint, and will no longer function as a sealant. At even higher temperatures, the same will happen with grease. Further, because they tend to be somewhat volatile at almost any practical temperature, these types of sealants may be a source of contamination to the fluid flowing through the joined glass tubes. In addition, even if the volatility of these sealants is not a significant problem, they may be chemically reactive with the fluid flowing through the tubes. As used herein, the word "fluid" means "anything that flows." Thus, "fluid" comprehends, without limitation, gases, liquids, suspensions, flowable solids, and mixtures of the same.

For applications in which these types of sealants are inappropriate, an o-ring can be used. Because the o-ring is typically made of a deformable solid and not a liquid or thixotrope, o-rings tend to be less volatile and reactive than the sealants mentioned above. Typical materials for o-rings include natural and synthetic rubbers and other thermoplastic resins, such as Viton and Buna-N. When an o-ring is used, either the socket, or more preferably, the ball is modified with an annular channel to receive and hold the o-ring.

Unfortunately, some applications, such as higher temperature applications and applications in which a fluid that is corrosive to the seal is flowing through the joint, exceed the ability of the o-ring to resist degradation. For example, at a sufficiently high temperature for a sufficient length of time, most o-ring materials will loose some amount of their more volatile components.

This degradation of the o-ring compromises the integrity of the joint seal, which can adversely affect the process in which the joint is used. For example, if the static or dynamic pressure within the glass tubes is less than the pressure outside of the joint, then the loss of the o-ring seal may allow air or other fluids from outside of the joint to be drawn into the joint, thus increasing the pressure within the glass tubes. Additionally, the loss of the seal may allow the environment on the outside of the joint to permeate the joint and contaminate the environment inside of the glass tubes. Further, if the fluid within the glass tubes is corrosive or otherwise toxic and is at a higher pressure relative to the outside environment, then it may create health or other problems if is escapes from the joint.

Another method of improving the impermeability of the ball joint is to provide a coupling that exerts axial pressure on the joint, and thus tends to hold the ball within the socket. Typically, a coupling is used in combination with a seal, as this tends to provide the highest joint integrity. The coupling works by engaging one portion of the coupling on the back of the socket and engaging another portion of the coupling on the back of the ball. These pieces are then drawn toward each other and held together with some sort of mechanism, such as a single spring and fulcrum set, or a single set screw and fulcrum.

One design problem that exists with couplings is how to get the coupling pieces around the glass tubes. If the coupling is placed on the glass tubes by sliding it over either the ball or the socket from their free ends, then the hole in the coupling is too large to engage the back of the ball or socket and draw them toward each other. This is not a problem when the glass tubes to be joined are short and not attached to anything else at their other ends. In this case, the coupling halves can merely be slid over the free ends of the tubes, which typically have a smaller diameter than the ball and socket. Thus, in such a case, the hole in each coupling piece can be just large enough to fit over the glass tubing, and small enough so that each piece will engage the backs of the ball and socket.

However, in most applications either the glass tube is so long as to make it inconvenient to slip the coupling over the free end of the glass tube, or the glass tube is connected to something else, such as a plate, bell jar, or larger diameter tube, over which the coupling piece cannot be placed.

One method of overcoming this problem is to make each of the coupling halves in the shape of a "c." The open side of the c is just large enough to slip over the smaller diameter of the glass tube from the side rather than from one end or the other, and the rest of the c is used to apply pressure to the backs of the ball and socket. Unfortunately, the coupling cannot apply any pressure to the backs of the ball or socket in the cutout portion of the c, and the part which draws the two coupling pieces together is typically located at a single point opposite the cutout portion of the c. Thus, these prior art c-couplings do not exert uniform axial loading on the ground glass joint.

This situation tends to create a condition in the joint where it may leak due to the unevenly applied forces. While this may not be a problem in some applications, in other applications, such as in the semiconductor manufacturing industry where ground glass ball and socket joints are used on reaction vessels such as diffusion tubes, even small contaminants can create a big problem.

What is needed therefore, is a system for more uniformly axially loading a ground glass joint, and a system for containing toxins that may escape from or enter through compromised ground glass joints.

SUMMARY

The above and other needs are met by a system for coupling a ball fitting having a diameter to a socket fitting having a diameter. The ball fitting is connected to a first tubing having a diameter, and the socket fitting is connected to a second tubing having a diameter.

A first coupling piece forms an aperture having a diameter that is larger than the diameter of the ball fitting and the diameter of the first tubing. The aperture of the first coupling piece receives the ball fitting and the first tubing through the first coupling piece. The first coupling piece also forms an annular race that is disposed concentric with and outside of the aperture in the first coupling piece. An annular surface is disposed concentric with and between the annular race of the first coupling piece and the aperture of the first coupling piece.

First split ring pieces are adapted to be assembled into a first ring. The first ring forms an aperture having a diameter that is smaller than the diameter of the ball fitting and larger than the diameter of the first tubing. The aperture of the first ring receives the first tubing through the first ring. The first ring also forms an annular ridge that is disposed concentric with and outside of the aperture in the first ring. The annular ridge engages the annular race of the first coupling piece, and assists in aligning and holding the first split ring pieces together in the first ring. A first surface is disposed concentric with and between the annular ridge of the first ring and the aperture of the first ring.

The annular surface of the first coupling piece applies uniform axial pressure to the first surface of the first ring. The first ring has a second surface opposing the first surface that is disposed concentric with and outside of the aperture of the first ring. The second surface applies uniform axial pressure to a back portion of the ball fitting.

A second coupling piece forms an aperture having a diameter that is larger than the diameter of the socket fitting and the diameter of the second tubing. The aperture of the second coupling piece receives the socket fitting and the second tubing through the second coupling piece. The second coupling piece also forms an annular race that is disposed concentric with and outside of the aperture in the second coupling piece. An annular surface is disposed concentric with and between the annular race of the second coupling piece and the aperture of the second coupling piece.

Second split ring pieces are adapted to be assembled into a second ring. The second ring forms an aperture having a diameter that is smaller than the diameter of the socket fitting and larger than the diameter of the second tubing. The aperture of the second ring receives the second tubing through the second ring. The second ring also forms an annular ridge that is disposed concentric with and outside of the aperture in the second ring. The annular ridge engages the annular race of the second coupling piece, and assists in aligning and holding the second split ring pieces together in the second ring. A first surface is disposed concentric with and between the annular ridge of the second ring and the aperture of the second ring.

The annular surface of the second coupling piece applies uniform axial pressure to the first surface of the second ring. The second ring has a second surface opposing the first surface that is disposed concentric with and outside of the aperture of the second ring. The second surface applies uniform axial pressure to a back portion of the socket fitting.

Engagement means reversibly draw the first coupling piece and the second coupling piece toward each other, and releasably hold the first coupling piece and the second coupling piece together with uniform axial pressure.

One of the great benefits of this system is that it provides uniform axial pressure to the backs of both the ball fitting and the socket fitting. Further, this is accomplished without having to slip the coupling over the ends of the tubings that aren't connected to the fittings, which, as explained above, is not always possible or convenient. The system is used by slipping the first coupling piece over the ball fitting and onto the first tubing. The first ring is then assembled around the first tubing by placing the annular ridge portions on each of the first split ring pieces into the annular race in the first coupling piece. The way in which the annular ridge fits into the annular race aligns the first split ring pieces into the first ring.

The second coupling piece is slipped over the socket fitting and onto the second tubing. The second ring is then assembled around the second tubing by placing the annular ridge portions on each of the second split ring pieces into the annular race in the second coupling piece. Just as described above for the first ring, the way in which the annular ridge fits into the annular race aligns the second split ring pieces into the second ring.

In a preferred embodiment, the engagement means are a threaded portion on an inside surface of the first coupling piece and threaded portion on an outside surface of the second coupling piece. The threaded portion of the first coupling piece engages the threaded portion on the second coupling piece. When the first coupling piece is axially rotated relative to the second coupling piece, the first coupling piece and the second coupling piece are reversibly drawn toward each other and are releasably held together with uniform axial pressure. By either partially screwing or partially unscrewing the fittings, the axial pressure on the ball joint is increased or decreased, respectively.

The axial pressure is uniform because the couplings do not create the pressure on the ball joint at just a single point. The coupling pieces, which each have an aperture that is so large as to fit completely over the fitting and prevents the coupling pieces from exerting pressure directly on the fittings, exert pressure on the rings that are assembled around the tubings. The rings then each have an aperture that is small enough that it can exert axial pressure on the back of the fitting, and thus work cooperatively to keep the fittings in place.

In an alternate embodiment the engagement means include holes formed in the first coupling piece that are uniformly spaced around a circumference of the first coupling piece. The holes in the first coupling piece are disposed parallel to the aperture of the first coupling piece. The second coupling piece also forms holes that are uniformly spaced around a circumference of the second coupling piece, the holes in the second coupling piece are disposed parallel to the aperture of the second coupling piece.

Fastening pins extend through the holes of the first coupling piece and through the holes of the second coupling piece. Each of the fastening pins has a retaining surface on one end of the fastening pin, which engages and retains the first coupling piece. Retainers engage the ends of the fastening pins that do have the retaining surface. The retainers engage and retain the second coupling piece, and reversibly draw the first coupling piece and the second coupling piece toward each other, and releasably hold the first coupling piece and the second coupling piece together with uniform axial pressure.

In further preferred embodiments both the first coupling piece and the second coupling piece are made of stainless steel, both the first split ring pieces and the second split ring pieces are made of Teflon, and both the first split ring pieces and the second split ring pieces each comprise a set of two pieces. In an especially preferred embodiment, the second surface of the first ring has a chamfer adapted to receive a curved portion on the back portion of the ball fitting, and the second surface of the second ring has a chamfer adapted to receive a curved portion on the back portion of the ball fitting.

An alternate embodiment of the system provides a unified coupling body, that forms an open main aperture having a first section, a second section, and a third section. The first section of the main aperture of the unified coupling body is disposed adjacent a first end of the unified coupling body, and has a diameter that is smaller than the diameter of the ball fitting and larger than the diameter of the first tubing. The first section of the main aperture of the unified coupling body receives the first tubing into the unified coupling body.

The second section of the main aperture of the unified coupling body is disposed adjacent the first section of the main aperture of the unified coupling body in a middle portion of the unified coupling body. The second section of the main aperture has a diameter that is larger than the diameter of the first tubing, larger than the diameter of the ball fitting, larger than the diameter of the socket fitting, and larger than the diameter of the second tubing. The second section of the main aperture of the unified coupling body receives the first tubing, the ball fitting, the socket fitting, and the second tubing into the unified coupling body.

The third section of the main aperture of the unified coupling body is disposed adjacent the second section of the main aperture of the unified coupling body, and adjacent a second end of the unified coupling body. The third section has a diameter that is smaller than the diameter of the socket fitting and larger than the diameter of the second tubing. The third section of the main aperture of the unified coupling body receives the second tubing into the unified coupling body.

The unified coupling body also forms an open access aperture, that is disposed adjacent the second section of the main aperture of the unified coupling body in the middle portion of the unified coupling body, and has a diameter that is larger than the diameter of the first tubing, larger than the diameter of the ball fitting, larger than the diameter of the socket fitting, and larger than the diameter of the second tubing. The access aperture of the unified coupling body receives the first tubing, the ball fitting, the socket fitting, and the second tubing into the second section of the main aperture of the unified coupling body.

A first compression seat forms an open aperture having a diameter that is smaller than the diameter of the ball fitting and larger than the diameter of the first tubing. The aperture of the first compression seat receives the first tubing through the first compression seat. The first compression seat has a first surface and a second surface opposing the first surface. The second surface is disposed concentric with and outside of the aperture of the first compression seat, and applies axial pressure to a back portion of the ball fitting.

A second compression seat forms an open aperture having a diameter that is smaller than the diameter of the socket fitting and larger than the diameter of the second tubing. The aperture of the second compression seat receives the second tubing through the second compression seat. The second compression seat has a first surface disposed adjacent the second end of the unified coupling body. The first surface of the second compression seat receives axial pressure from the second end of the unified coupling body. The second compression seat also has a second surface opposing the first surface. The second surface is disposed concentric with and outside of the aperture of the second compression seat, and applies axial pressure to a back portion of the socket fitting.

Compression means are disposed between the first end of the unified coupling body and the first surface of the first compression seat. The compression means create axial pressure between the first end of the unified coupling body and the first surface of the first compression seat.

In various preferred embodiments, pressure adjustment means selectively increase and decrease the axial pressure created by the compression means between the first end of the unified coupling body and the first surface of the first compression seat. The compression means and the pressure adjustment means may be screws that engage the first end of the unified coupling body in a threaded fashion. The compression means may be at least one spring that is disposed between the first end of the unified coupling body and the first surface of the first compression seat.

Retraction means may be added for selectively retracting the first surface of the first compression seat through the second section of the main aperture of the unified coupling body, and toward the first end of the unified coupling body. In especially preferred embodiments, the unified coupling body is made of stainless steel and the first compression seat and the second compression seat are made of Teflon. Preferably, the second surface of the first compression seat has a chamfer adapted to receive a curved portion on the back portion of the ball fitting, and the second surface of the second compression seat has a chamfer adapted to receive a curved portion on the back portion of the ball fitting.

Yet another embodiment of the invention provides a main housing formed of at least two component pieces that are detachably assembled together. The main housing forms a control chamber having a minimum diameter that is larger than the diameter of the first tubing, larger than the diameter of the ball fitting, larger than the diameter of the socket fitting, and larger than the diameter of the second tubing.

A first tractable seal forms an aperture having a diameter that is larger than the diameter of the first tubing and smaller than the diameter of the ball fitting. The first tractable seal creates a hermetic seal between the first tubing and the main housing, and further keeps the first tubing and the ball fitting from axially translating relative to the main housing.

A second tractable seal forms an aperture having a diameter that is larger than the diameter of the second tubing and smaller than the diameter of the socket fitting. The second tractable seal creates a hermetic seal between the second tubing and the main housing, and further keeps the second tubing and the socket fitting from axially translating relative to the main housing. The main housing, first tractable seal, and the second tractable seal form a hermetic enclosure around the ball fitting and the socket fitting.

In various preferred embodiments, a pipe portion is disposed on the main housing, and forms a port into the hermetic enclosure, and provides the controlled environment within the control chamber. The controlled environment is preferably one of an inert gas introduced through the pipe portion, a vacuum drawn through the pipe portion, and fluid selected to be identical to a fluid flowing within the first tubing, the ball fitting, the socket fitting, and the second tubing.

In especially preferred embodiments, the system of the first and second coupling pieces, or the system of the unified coupling body is disposed entirely within the controlled environment of the main housing.

BRIEF DESCRIPTION OF THE DRAWINGS

Further advantages of the invention will become apparent by reference to the detailed description when considered in conjunction with the figures, which are not to scale so that detail may be more clearly depicted, wherein like reference numbers indicate like elements throughout the several views, and wherein:

FIG. 3 depicts an exploded side view of the first embodiment of the invention.

DETAILED DESCRIPTION

Figure 1:
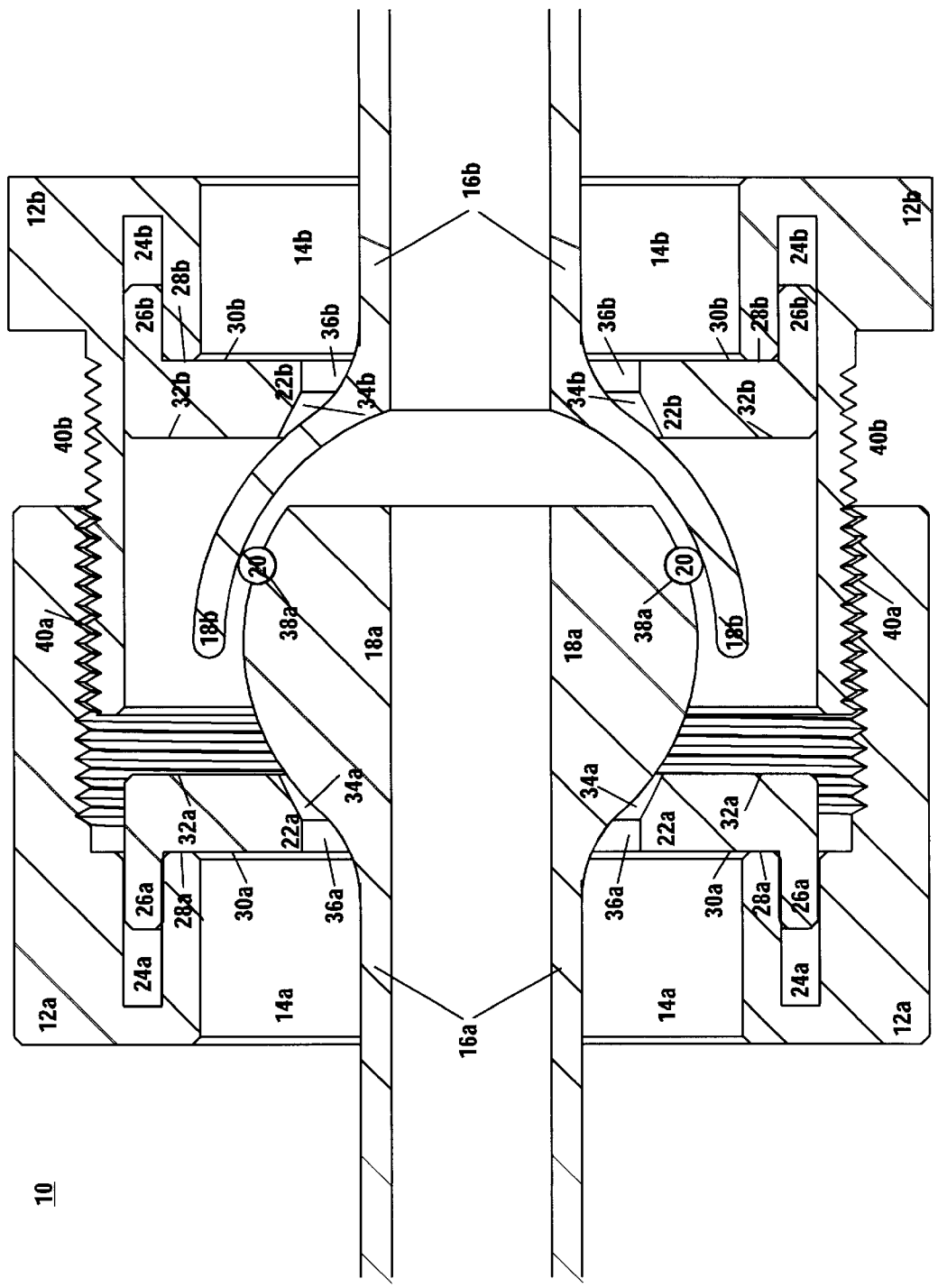
FIG. 1 depicts a cross-sectional side view of a first embodiment of the invention.

Referring now to FIG. 1, there is depicted a first embodiment of a coupling 10 according to the present invention. Ball fitting 18a is connected to the end of tubing 16a, and socket fitting 18b is connected to the end of tubing 16b. Preferably, the diameter of the tubing 16a is smaller than the diameter of the ball fitting 18a, and the diameter of the tubing 16b is smaller than the diameter of the socket fitting 18b. While the diameter of the tubing 16a as depicted in FIG. 1 is about the same as the diameter of the tubing 16b, this is not a requirement. Further, as can be seen in FIG. 1, the diameter of the socket fitting 18b tends to be larger than the diameter of the ball fitting 18a over which it fits.

Seal 20 is disposed between the outside of the ball fitting 18a and the inside of the socket fitting 18b, and is retained in position between the ball fitting 18a and socket fitting 18b with a groove 38 that is formed on the outside surface of ball fitting 18a. Although the seal 20 is depicted in FIG. 1 as an o-ring, it will be appreciated that the invention is equally applicable to other types of seals as described previously. Further, the invention may be applied even when no seal at all is used between the ball fitting 18a and the socket fitting 18b.

Once the ball and socket joint is fitted together, the coupling 10 acts to keep the ball fitting 18a and the socket fitting 18b snugly together by applying uniform axial pressure to the joint. The first coupling piece 12a has an aperture 14a that has a diameter that is larger than the diameter of the first tubing 16a and the ball fitting 18a. As described herein, first coupling piece 12a is described in relation to the first tubing 16a and the ball fitting 18a. However, it will be appreciated that the first coupling piece 12a and the second coupling piece 12b are interchangeable, meaning that either of the first coupling piece 12a or the second coupling piece 12b can be placed over either of the ball fitting 18a or the socket fitting 18b.

The coupling 10 is preferably formed of a sturdy, durable material such as stainless steel. However, the coupling 10 may be formed of any rigid material, such as a relatively tough plastic. In some applications, the material of which the coupling 10 is formed is preferably a thermoplastic resin, as such materials may be more resistant to the environment in which the coupling 10 is used. For example, if the coupling 10 is used in an environment that is corrosive to metals, then plastic construction would be preferable to metal construction. Further, it may be preferred for the first coupling piece 12a and the second coupling piece 12b to each be formed of a different material, which may provide benefits as described more completely below.

Because the diameter of the aperture 14a is larger than either the diameter of the first tubing 16a or the ball fitting 18a, the first coupling piece 12a can be slipped over the ball fitting 18a and onto the first tubing 16a. However, because the diameter of the aperture 14a is larger than either the diameter of the first tubing 16a or the ball fitting 18a, the first coupling piece 12a cannot itself directly apply axial pressure to the back portion of the ball fitting 18a to keep the joint together.

The first coupling piece 12a has an annular race 24a formed within it. The annular race 24a is disposed concentric with the aperture 14a. Also, the annular race 24a is disposed outside of the aperture 14a. By this it is meant that the annular race 24a has a diameter that is larger than the diameter of the portion of the aperture 14a by which it is most nearly disposed. However, this does not imply that the annular race 24a is disposed on the outside of the first coupling piece 12a. As is evident from FIG. 1, the annular race 24a is disposed within the body of the first coupling piece 12a.

Between the annular race 24a of the first coupling piece 12a and the aperture 14a of the first coupling piece 12a there is disposed an annular surface 28a. The annular surface 28a is concentric with the aperture 14a and the annular race 24a of the first coupling piece 12a. As described herein, the components of the coupling 10 are cylindrical, in that the cross-section of the coupling 10 taken at an angle that is perpendicular to the axis of the coupling 10 is circular. However, this is not a necessary limitation of the present invention.

The cross-section of the coupling 10 is preferably circular, because the cross-section of the joint is typically circular. However, even if the cross-section of the joint is circular, the cross-section of the coupling 10 could be some other shape, such as hexagonal. Further, if the cross-section of the joint was not circular, but some other shape such as octagonal, then it may be preferable for the cross-section of the coupling 10 to likewise be octagonal. The interrelationship between the cross-sectional shape of the various elements are further discussed below.

First split ring pieces 22a fit inside the body of the first coupling piece 12a within the aperture 14a. The first split ring pieces 22a are configured to form a first ring when assembled together. While any number of first split ring pieces 22a may be used, in the preferred embodiment, two first split ring pieces 22a are used. Preferably, the number of first split ring pieces 22a is greater than one, so that the first split ring pieces 22a can be assembled into the first ring around the first tubing 16a. This assembly is preferably done after the first coupling piece 12a has been slipped down around the first tubing 16a, at an assembly position disposed between the first coupling piece 12a and the ball fitting 18a.

When assembled into the first ring, the first split ring pieces 22a form an aperture 36a. The aperture 36a has a diameter that is just larger than the diameter of the first tubing 16a and smaller than the diameter of the ball fitting 18a. The diameter of the aperture 36a of the first ring may be very close to the diameter of the first tubing 16a, so that it can help to form a secondary seal around the first tubing 16a. The diameter of the aperture 36a of the first ring is smaller than the diameter of the ball fitting 18a, because portions of the first ring are used to provide axial pressure to the back portion of the ball fitting 18a, in a manner as described more completely below.

The first split ring pieces 22a each provide a portion of an annular ridge 26a. When the first split ring pieces 22a are assembled into the first ring, the portions of the annular ridge 26a form a single annular ridge 26a. The first split ring pieces 22a are most easily assembled into the first ring by placing them inside of the aperture 14a in the first coupling piece 12a, such that the annular ridge 26a fits within the annular race 24a. Thus, the annular ridge 26a of the first ring interacts with the annular race 24a of the first coupling piece 12a in such a manner that the annular race 24a of the first coupling piece 12a assists in properly aligning and holding the first split ring pieces 22a together in the first ring.

In an alternate embodiment, there is only a single first split ring piece 22a. In this embodiment, the first split ring piece 22a has a slit in it that runs from the outside circumference of the first split ring piece 22a through the annular ridge 26a to the aperture 26a. In this embodiment, the first split ring piece 22a is formed of a deformable material, such as plastic or Teflon. The first split ring piece 22a is placed around the first tubing 16a by deflecting the edges of the first split ring piece 22a on either side of the slit in a direction away from each other, and slipping the first split ring piece 22a around the first tubing 16a. In this embodiment, neither the annular race 24a nor the annular ridge 26a may be necessary.

The first ring has a first surface 30a disposed concentric with and between the annular ridge 26a and aperture 36a of the first ring. The first surface 30a of the first ring is disposed adjacent the annular surface 28a of the first coupling piece 12a when the first split ring pieces 22a are assembled into the first ring in the first coupling piece 12a. As axial pressure is generated within the first coupling piece 12a, as described more completely below, the axial pressure is transferred from the annular surface 28a of the first coupling piece 12a to the first surface 30a of the first ring.

The first ring has a second surface 32a that is disposed opposite the first surface 30a of the first ring. The second surface 32a is disposed concentric with and outside of the aperture 36a of the first ring. The second surface 32a receives the axial pressure transferred to the first ring from the first surface 30a of the first ring, and applies the axial pressure to the back portion of the ball fitting 18a. In a preferred embodiment, the second surface 32a of the first ring has a chamfer 34a at the edge of the aperture 36a of the first ring, which chamfer 34a is adapted to receive the curved portion of the back of the ball fitting 18a.

The first split ring pieces 22a are preferably formed of an elastic deformable material, such a thermoplastic resin. In a most preferred embodiment, the first split ring pieces 22a are formed of Teflon. By making the first split ring pieces 22a out of materials such as those described, several benefits are realized. For example, the first ring can make a better secondary seal around the first tubing 16a if the first ring makes a tight and compressible fit around the first tubing 16a. In addition, if the first ring is formed of an elastically deformable material, it will tend to not damage the first tubing 16a or the back of the ball joint 18a when the first ring is brought into a compressed alignment with the ball joint 18a. Further, by being somewhat compressible, the first ring is able to apply a more uniform axial pressure to the back surface of the ball joint 18a, which provides the benefits to the joint as described above.

The second coupling piece 12b and associated elements are formed in much the same way as described above for the first coupling piece 12a and associated elements. However, for the sake of completeness, the construction of the second coupling piece 12b and associated elements are described in detail below.

The second coupling piece 12b has an aperture 14b that has a diameter that is larger than the diameter of the second tubing 16b and the socket fitting 18b. As described above, second coupling piece 12b is interchangeable with the first coupling piece 12a, and either of the first coupling piece 12a or the second coupling piece 12b can be placed over either of the ball fitting 18a or the socket fitting 18b.

Because the diameter of the aperture 14b is larger than either the diameter of the second tubing 16b or the socket fitting 18b, the second coupling piece 12b can be slipped over the socket fitting 18b and onto the second tubing 16b. However, because the diameter of the aperture 14b is larger than either the diameter of the second tubing 16b or the socket fitting 18b, the second coupling piece 12b cannot itself directly apply axial pressure to the back portion of the socket fitting 18b to keep the joint together.

The second coupling piece 12b has an annular race 24b formed within it. The annular race 24b is disposed concentric with the aperture 14b. Also, the annular race 24b is disposed outside of the aperture 14b. As described above, by this it is meant that the annular race 24b has a diameter that is larger than the diameter of the portion of the aperture 14b by which it is most nearly disposed, and does not imply that the annular race 24b is disposed on the outside of the second coupling piece 12b. As is evident from FIG. 1, the annular race 24b is disposed within the body of the second coupling piece 12a.

Between the annular race 24b of the second coupling piece 12b and the aperture 14b of the second coupling piece 12b there is disposed an annular surface 28b. The annular surface 28b is concentric with the aperture 14b and the annular race 24b of the second coupling piece 12b. As described above, the components of the coupling 10 are cylindrical, in that the cross-section of the coupling 10 taken at an angle that is perpendicular to the axis of the coupling 10 is circular. However, this is not a necessary limitation of the present invention, as has been explained.

Second split ring pieces 22b fit inside the body of the second coupling piece 12b within the aperture 14b. The second split ring pieces 22b are configured to form a second ring when assembled together. While any number of second split ring pieces 22b may be used, in the preferred embodiment, two second split ring pieces 22b are used. Preferably, the number of second split ring pieces 22b is greater than one, so that the second split ring pieces 22b can be assembled into the second ring around the second tubing 16b. This assembly is preferably done after the second coupling piece 12b has been slipped down around the second tubing 16b, at an assembly position disposed between the second coupling piece 12b and the socket fitting 18b.

When assembled into the second ring, the second split ring pieces 22b form an aperture 36b. The aperture 36b has a diameter that is just larger than the diameter of the second tubing 16b and smaller than the diameter of the socket fitting 18b. The diameter of the aperture 36b of the second ring may be very close to the diameter of the second tubing 16b, so that it can help to form a secondary seal around the second tubing 16b. The diameter of the aperture 36b of the second ring is smaller than the diameter of the socket fitting 18b, because portions of the second ring are used to provide axial pressure to the back portion of the socket fitting 18b, in a manner as described more completely below.

The second split ring pieces 22b each provide a portion of an annular ridge 26b. When the second split ring pieces 22b are assembled into the second ring, the portions of the annular ridge 26b form a single annular ridge 26b. The second split ring pieces 22b are most easily assembled into the second ring by placing them inside of the aperture 14b in the second coupling piece 12b, such that the annular ridge 26b fits within the annular race 24b. Thus, the annular ridge 26b of the second ring interacts with the annular race 24b of the second coupling piece 12b in such a manner that the annular race 24b of the second coupling piece 12b assists in properly aligning and holding the second split ring pieces 22b together in the second ring.

In an alternate embodiment, there is only a single second split ring piece 22b. In this embodiment, the second split ring piece 22b has a slit in it that runs from the outside circumference of the second split ring piece 22b through the annular ridge 26b to the aperture 36b. In this embodiment, the second split ring piece 22b is formed of a deformable material, such as plastic or Teflon. The second split ring piece 22b is placed around the second tubing 16b by deflecting the edges of the second split ring piece 22b on either side of the slit in a direction away from each other, and slipping the second split ring piece 22b around the second tubing 16a. In this embodiment, neither the annular race 24b nor the annular ridge 26b may be necessary.

The second ring has a first surface 30b disposed concentric with and between the annular ridge 26b and aperture 36b of the second ring. The first surface 30b of the second ring is disposed adjacent the annular surface 28b of the second coupling piece 12b when the second split ring pieces 22b are assembled into the second ring in the second coupling piece 12b. As axial pressure is generated within the second coupling piece 12b, as described more completely below, the axial pressure is transferred from the annular surface 28b of the second coupling piece 12b to the first surface 30b of the second ring.

The second ring has a second surface 32b that is disposed opposite the first surface 30b of the second ring. The second surface 32b is disposed concentric with and outside of the aperture 36b of the second ring. The second surface 32b receives the axial pressure transferred to the second ring from the first surface 30b of the second ring, and applies the axial pressure to the back portion of the socket fitting 18b. In a preferred embodiment, the second surface 32b of the second ring has a chamfer 34b at the edge of the aperture 36b of the second ring, which chamfer 34b is adapted to receive the curved portion of the back of the socket fitting 18a. The second split ring pieces 22b are preferably formed of an elastic deformable material, such a thermoplastic resin, and most preferably of Teflon, which provides the benefits described above.

Engagement means are used to reversibly draw the first coupling piece 12a and the second coupling piece 12b toward each other, and releasably hold them together with uniform axial pressure. In the embodiment depicted in FIG. 1, the engagement means are provided by threaded portions 40a and 40b. As depicted, the first coupling piece 12a has a threaded portion 40a on the inside surface of the first coupling piece 12a, and the second coupling piece 12b has a threaded portion 40b on the outside surface of the second coupling piece 12b. The threaded portions 40a and 40b are designed to engage one with the other, so that as the first coupling piece 12a is axially rotated relative to the second coupling piece 12b, the threaded portions 40a and 40b further engage each other, and the first coupling piece 12a is reversibly drawn toward the second coupling piece 12b.

By rotating the first coupling piece 12a relative to the second coupling piece 12b in this manner, the first coupling piece 12a and the second coupling piece 12b are drawn together until the first ring inside of the first coupling piece 12a engages the back of the ball fitting 18a and the second ring inside of the second coupling piece 12b engages the back of the socket fitting 18b. Further rotating the first coupling piece 12a relative to the second coupling piece 12b will cause the first ring and the second ring to deform slightly, thus applying a very uniform axial pressure to the backs of the ball fitting 18a and the socket fitting 18b, and keeping the joint together. In this manner a seal, such as the o-ring 20, will also be slightly deformed and will tend to create a more impermeable joint.

In a similar fashion, by rotating the first coupling piece 12a relative to the second coupling piece 12b in the opposite direction of rotation from that as described above, the first coupling piece 12a and the second coupling piece 12b are axially translated apart relative to each other. This causes the first ring and the second ring to deform less, thus tending to reduce that overall level of the uniform axial pressure applied to the backs of the ball fitting 18a and the socket fitting 18b. Thus, by careful adjustment of the first coupling piece 12a and the second coupling piece 12b in this manner, a precise amount of uniform axial pressure can be exerted on the joint.

Although FIG. 1 depicts, and the discussion above describes the threaded portion 40a of the first coupling piece 12a as being on the inside surface of the first coupling piece 12a, and the threaded portion 40b of the second coupling piece 12b as being on the outside surface of the second coupling piece 12b, it will be appreciated that this specific arrangement is exemplary only, and the either one of the threaded portions 40a or 40b could be disposed on the outside of its respective coupling piece 12a or 12b, so long as the other of the threaded portions 40a or 40b is disposed on the inside of its respective coupling piece 12a or 12b.

Figure 2:
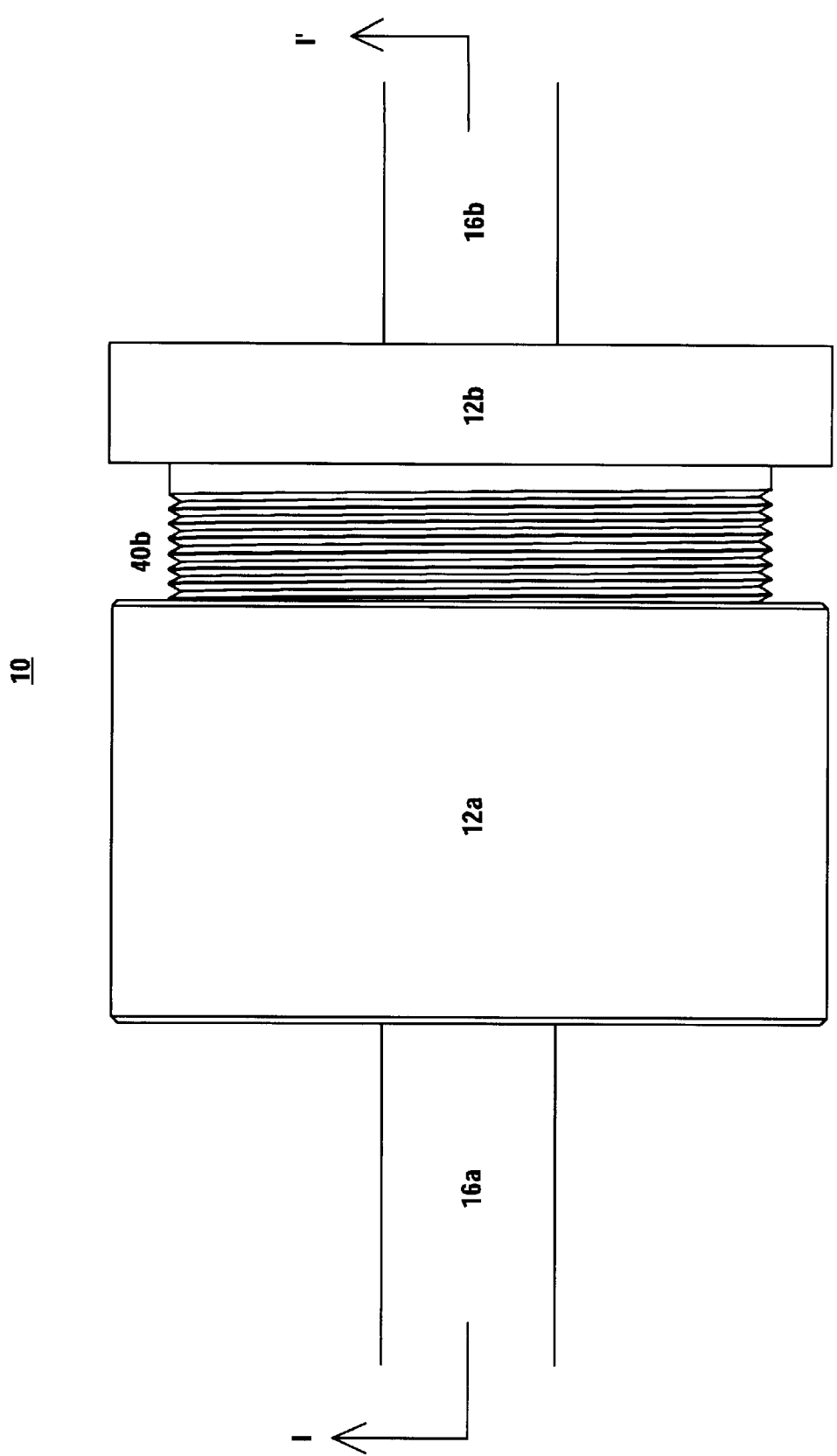
FIG. 2 depicts a side view of the first embodiment of the invention.

FIG. 2 depicts a side view of the coupling 10 assembled over a joint. Tubings 16a and 16b extend out of opposite ends of the coupling 10, and threaded portion 40b of the second coupling piece 12b can be seen as it is engaged within the body of the first coupling piece 12a. FIG. 1 shows the cross-section of the system of FIG. 2 along section I–I'.

FIG. 3 is an exploded side view of this same embodiment of a coupling 10 according to the present invention. In FIG. 3, ball fitting 18a can be seen as connected to tubing 16a and socket fitting 18b can be seen as connected to tubing 16b. As depicted in the various figures herein, tubings 16a and 16b are very short. However, this is merely for convenience in drawing the figures. In actual use, the tubings 16a and 16b would most likely be of either much greater length, or connected to some other apparatus at their free ends.

As can be seen in FIG. 3, the first split ring pieces 22a are assembled with the annular ridge 26a facing toward the first coupling piece 12a and with the second surface 32a facing toward the back of the ball fitting 18a. Similarly, the second split ring pieces 22b are assembled with the annular ridge 26b facing toward the second coupling piece 12b and with the second surface 32b facing toward the back of the socket fitting 18b. The first split ring pieces 22a are placed within the first coupling piece 12a by fitting the annular ridge 26a within the annular race 24a (not depicted in FIG. 3), and the second split ring pieces 22b are placed within the second coupling piece 12b by fitting the annular ridge 26b within the annular race 24b (not depicted in FIG. 3). The first and second coupling pieces 12a and 12b and brought toward the joint, and the threaded portions 40a and 40b are engaged as described above.

As depicted in FIG. 3, it appears that the first and second coupling pieces 12a and 12b are slipped onto the tubings 16a and 16b from their free ends, and not from the ends on which the ball fitting 18a and socket fitting 18b are joined, respectively. However, this is not the case, and is an anomaly of FIG. 3 as drafted. As explained above, the free ends of the tubings 16a and 16b would typically be connected to pieces that would prevent the first and second coupling pieces 12a and 12b from fitting onto the tubings 16a and 16b from that end. Thus, the first coupling 12a is slipped over the ball fitting 18a at the end of the first tubing 16a prior to assembling the first ring, and the second coupling 12b is slipped over the socket fitting 18b at the end of the second tubing 16b prior to assembling the second ring.

In an alternate embodiment the engagement means are provided by fastening pins, such as bolts, that extend from the first coupling piece 12a to the second coupling piece 12b. In this embodiment, holes are uniformly spaced around the circumference of the first and second coupling pieces 12a and 12b. The holes are formed so as to be parallel to the apertures 14a and 14b of the first and second coupling pieces 12a and 12b, respectively. On one end of the retaining pins is a retaining surface, such as heads on the bolts, that engage and hold one of either the first coupling piece 12a or the second coupling piece 12b. Retainers engage the other ends of the retaining pins, and engage and retain the other coupling piece 12a or 12b.

This can be accomplished in a variety of ways. For example, if bolts are used as the retaining pins, the end of each bolt that extends out of the far side of the other coupling piece can be retained by a nut. Alternately, the coupling piece 12a or 12b at the distal end of the retaining pin can be fitted with threads within the holes, such that the bolt screws directly into the coupling piece 12a or 12b.

In this embodiment it is preferable that at least two sets of holes and retaining pins be used to fasten the first coupling piece 12a to the second coupling piece 12b. By using at least two such sets, a more uniform axial pressure is applied to the joint. For some applications, having an even greater number of such sets will provide an even more uniform axial pressure to the joint.

Selection of the cross sectional shape of the coupling 10, as briefly mentioned above, is determined at least in part on the selection of the engagement means. For example, if the engagement means are the threaded portions 40a and 40b, which engage each other by axial rotation, then the cross sectional shape of the coupling 10 is preferably circular.

However, if retaining pins are selected as the engagement means, then one of the other cross sectional shapes, such as octagonal as described above, may be alternately selected. In this case, the selection of the cross sectional shape may depend more heavily on other factors, such as the cross sectional shape of the joint around which the coupling 10 is used. For example, if the joint is pentagonal, then a pentagonal coupling 10 that uses retaining pins as described above may be the preferred embodiment to keep the joint together with uniform axial pressure.

Figure 4:
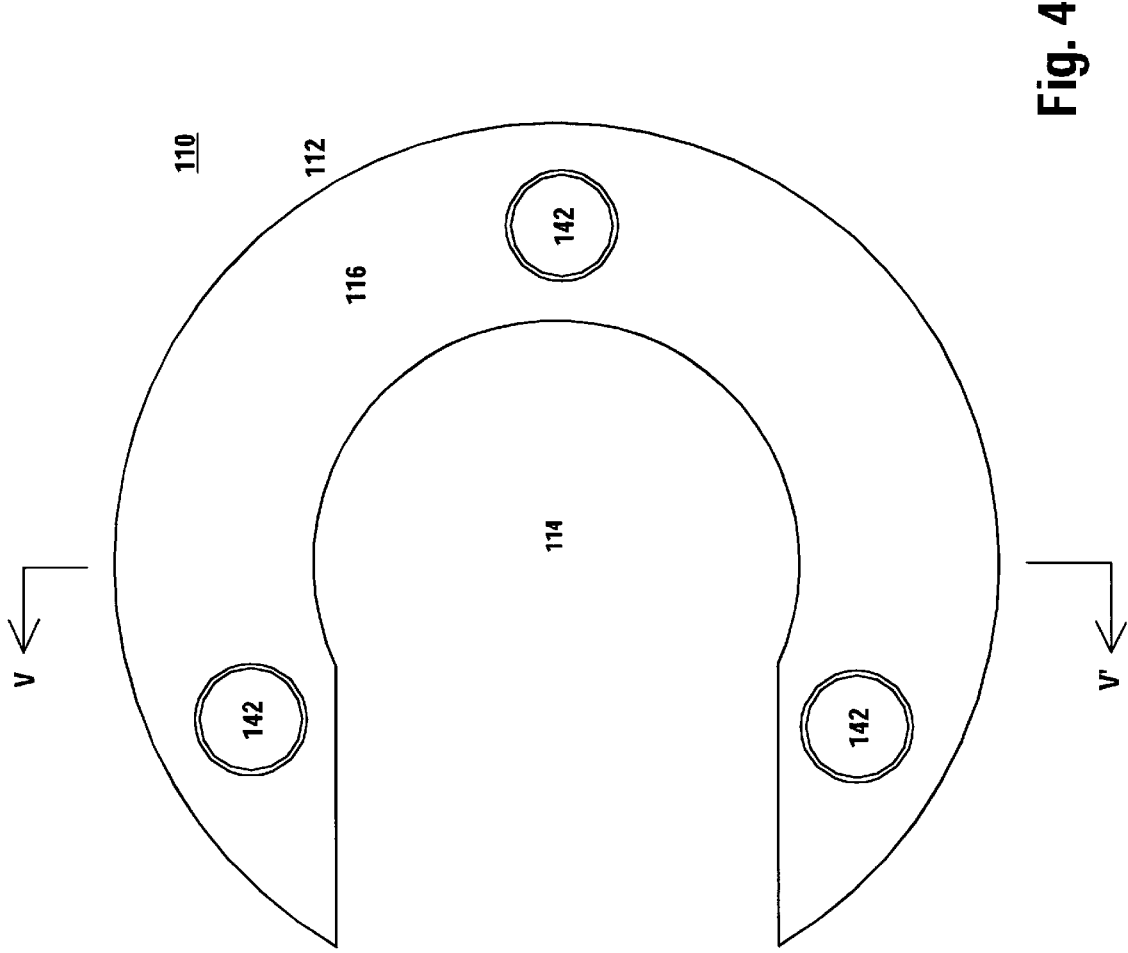
FIG. 4 depicts a top view of a second embodiment of the invention.

Another embodiment of a coupling 110 is depicted in FIG. 4. In this embodiment, a unified coupling body 112 is provided to hold the ball and socket joint snugly together. The unified coupling body 112 forms an open main aperture 114, which has a first section 114a, a second section 114b, and third section 144c, which are not explicitly depicted in FIG. 4, and which are described with greater particularity below. The unified coupling body 112 may be formed of a variety of materials, which are selected according to criteria similar to those discussed for the construction of the coupling 10, described above. In a preferred embodiment, the unified coupling body 112 is made of stainless steel.

The open main aperture 114 is called an "open" aperture because its circumference is not bounded by a single flat surface of the unified coupling body 112. For example, as depicted in FIG. 4, the open main aperture 114 is disposed within not only the first end 116 of the unified coupling body 112, but also the side surface depicted at the left hand side of the unified coupling body 112 in FIG. 4, and further, is disposed within the second end 118 (not depicted in FIG. 4) of the unified coupling body 112. As can be seen from FIG. 4, the arrangement of the open main aperture 114 in the unified coupling body 112 makes the unified coupling body 122 appear to be generally C-shaped when viewed from the first end 116.

Figure 5:
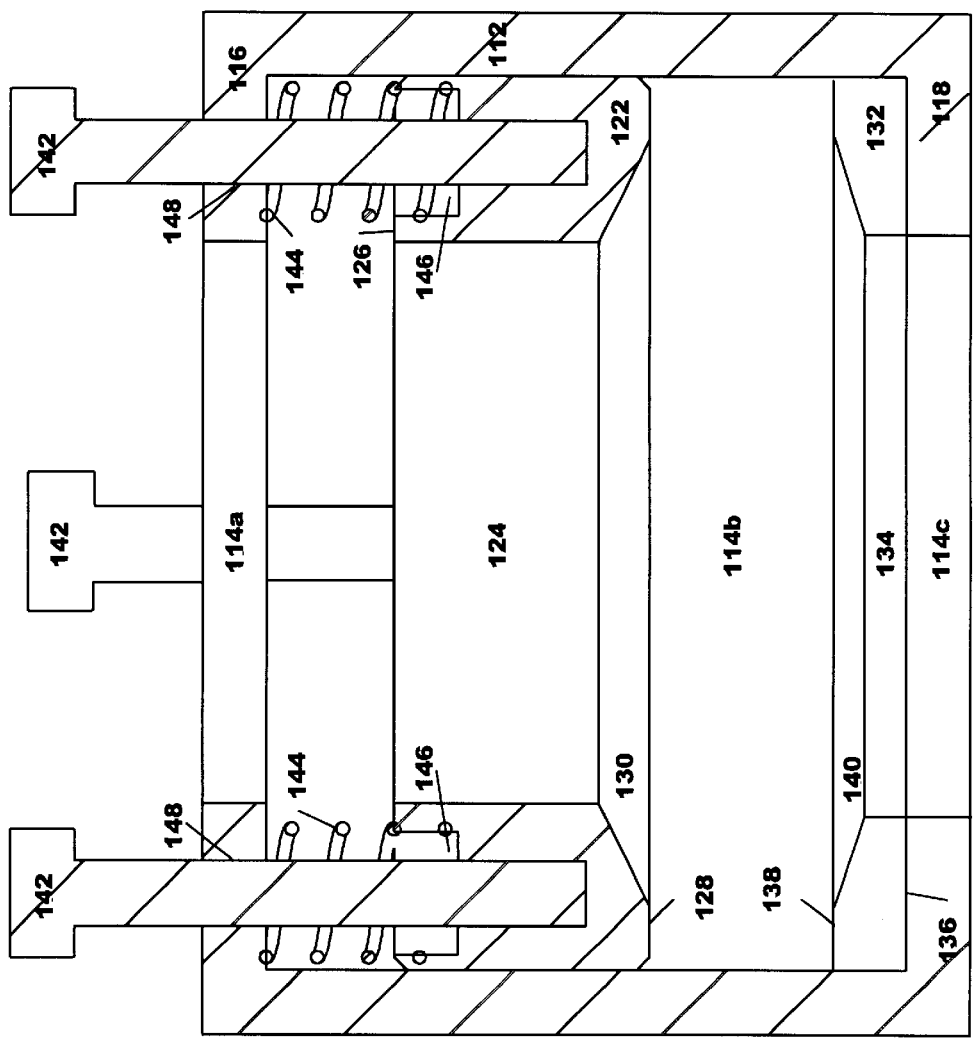
FIG. 5 depicts a cross-sectional side view of the second embodiment of the invention.

FIG. 5 depicts a side cross sectional view of the unified coupling body 112 of FIG. 4 along section V–V', which allows the inner elements of the unified coupling body 112 to be displayed. The first section of the open main aperture 144a is disposed adjacent the first end 116 of the unified coupling body 112, and has a diameter that is smaller than the diameter of the ball fitting 18a and larger than the diameter of the first tubing 16a. The first tubing 16a, ball fitting 18a, socket fitting 18b, and second tubing 16b are not depicted in the figures depicting the unified coupling body 112, so that the elements of the unified coupling body 112 may be more easily seen and more readily understood. However, reference numbers in regard to the first tubing 16a, ball fitting 18a, socket fitting 18b, and second tubing 16b are continued through this description of the unified coupling body 112 for clarity.

The first section of the open main aperture 114a receives the first tubing 16a into the unified coupling body 112. Because the first section of the open main aperture 114a is an open aperture as described above, the first section of the open main aperture 114a does not need a diameter that is large enough to accommodate the diameter of the ball fitting 18a. Rather, the unified coupling body 112 can be slipped over the first tubing 16a, ball fitting 18a, socket fitting 18b, and second tubing 16b, with the first section of the open main aperture 114a receiving just the first tubing 16a, and other sections of the open main aperture 114 receiving other portions of the ball fitting 18a, socket fitting 18b, and second tubing 16b, as described more completely below.

As mentioned above for the coupling 10, it will be appreciated that there is no limitation intended for the first section of the open main aperture 114a to function solely in conjunction with the first tubing 16a. Rather, the first section of the open main aperture 114a may receive the second tubing 16b by merely reversing the orientation of the unified coupling body 112 relative to the first tubing 16a, ball fitting 18a, socket fitting 18b, and second tubing 16b.

This same principle as described is equally applicable to the other sections of the open main aperture 114 and other portions of the first tubing 16a, ball fitting 18a, socket fitting 18b, and second tubing 16b, which the other sections of the open main aperture 114 are intended to receive, as described below. However, so as to not become unduly repetitious in the description of the unified coupling body 112, the elements and the functions of the unified coupling body 112 are described herein with reference to only a single orientation.

The second section of the open main aperture 114b is disposed adjacent the first section of the main aperture 114a in a middle portion of the unified coupling body 112. The diameter of the second section of the main aperture 114b is larger than the diameters of the first tubing 16a, ball fitting 18a, socket fitting 18b, and second tubing 16b. The second section of the main aperture 114b receives the first tubing 16a, ball fitting 18a, socket fitting 18b, and second tubing 16b into the unified coupling body 112.

The third section of the open main aperture 114c is disposed adjacent the second section of the open main aperture 114b, and adjacent the second end 118 of the unified coupling body 112. The diameter of the third section of the open main aperture 114c is smaller than the diameter of the socket fitting 18b and larger than the diameter of the second tubing 16b. The third section of the open main aperture 114c receives the second tubing 16b into the unified coupling body 112.

Figure 6:
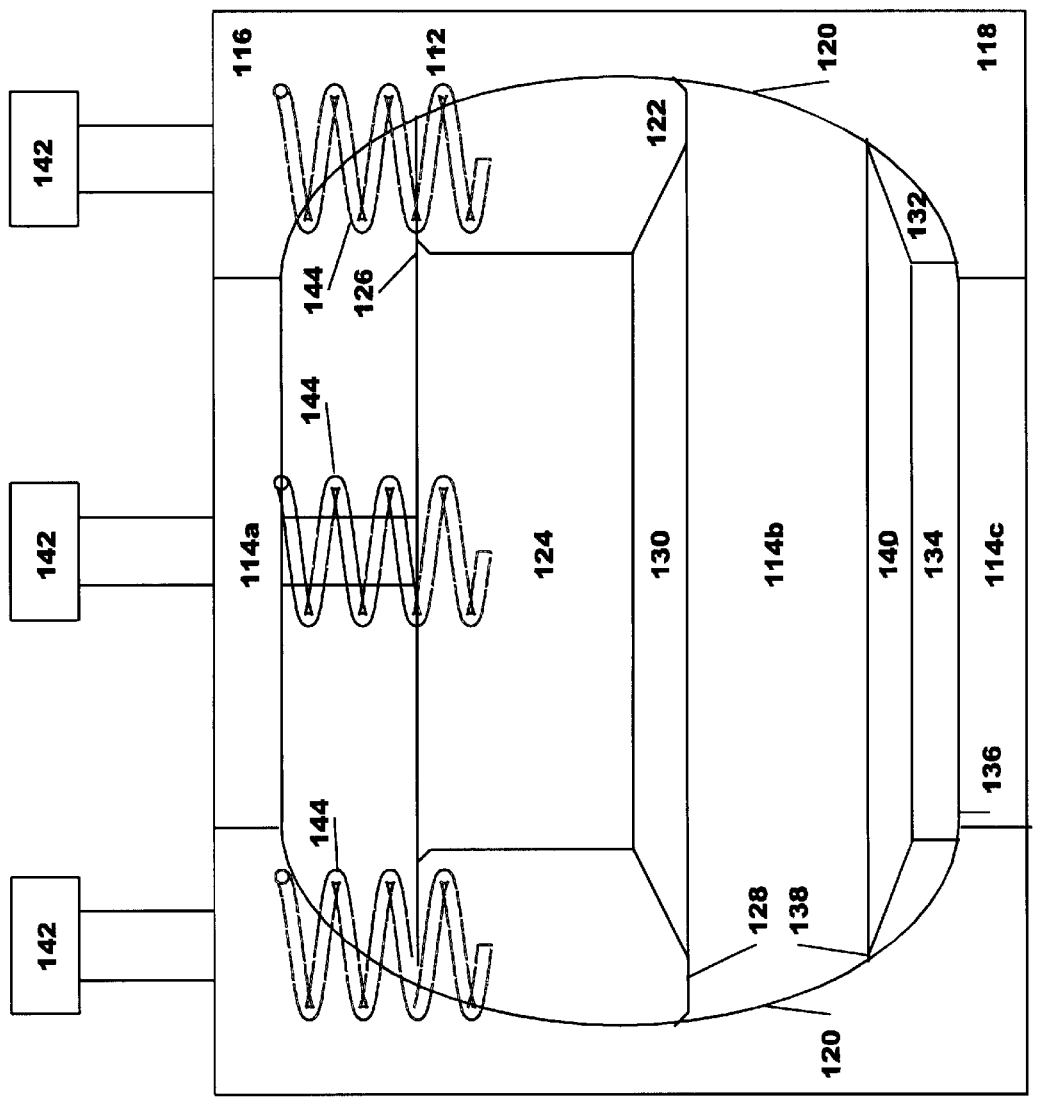
FIG. 6 depicts a side view of the second embodiment of the invention.

An open access aperture 120, as depicted in FIG. 6, is also formed within the unified coupling body 112. The open access aperture 120 is disposed adjacent the second section of the main aperture 114b in the middle section of the unified coupling body 112. The diameter of the open access aperture 120 is larger than the diameters of the first tubing 16a, ball fitting 18a, socket fitting 18b, and second tubing 16b. The open access aperture 120 receives the first tubing 16a, ball fitting 18a, socket fitting 18b, and second tubing 16b into the second section of the open main aperture 114b of the unified coupling body.

As depicted in FIG. 6, the open access aperture 120 flares out to a larger diameter than the diameters of the first section of the open main aperture 114a and the third section of the open main aperture 114c, which the open access aperture 120 contacts at it opposite ends near the first end 116 of the unified coupling body 112 and the second end 118 of the unified coupling body 112. Thus, the open access aperture 120 provides access to the second section of the open main aperture 114b for objects that are larger than either the first section of the open main aperture 114a or the third section of the open main aperture 114c.

It will be appreciated that all of the apertures described above, including the open main aperture 114, the first section of the open main aperture 114a, the second section of the open main aperture 114b, the third section of the open main aperture 114c, and the open access aperture 120, are all part of a single carved out void within the unified coupling body 112. However, these several portions of the void have been given separate designations as described above, so as to more clearly indicate the particular dimensions of the several portions relative to each other and the elements of the joint, and so as to more clearly indicated the functions that each of these several portions provide.

The balance of the description in regard to the coupling 110 is made in reference to both FIGS. 5 and 6, each of which depict most, but not all of the elements described below, and which when used together will provide a more complete understanding of the coupling 110.

A first compression seat 122 is disposed within the second section of the open main aperture 114b. The first compression seat 122 as depicted fills most of the second section of the open main aperture 114b. However, this is not necessarily a requirement, and the size of the first compression seat 122 is determined by the size of the ball and socket joint that it is intended to engage, as described more completely below.

The first compression seat 122 forms an open aperture 124 having a diameter that is smaller than the diameter of the ball fitting 18a and larger than the diameter of the first tubing 16a. The open aperture 124 receives the first tubing 16a through the first compression seat 122. For this reason, the diameter of the first compression seat 122 must be at least somewhat larger than the diameter of the first tubing 16a. This required size of the first compression seat 122 further requires that the diameter of the second section of the open main aperture 114b also be at least this large.

A first surface 126 of the first compression seat 122 is aligned toward the first end 116 of the unified coupling body 112 and a second surface 128 is aligned toward the middle of the unified coupling body 112. The first surface 126 of the first compression seat 122 receives axial pressure, and the second surface 128 of the first compression seat 122 applies axial pressure to the back of the ball fitting 18a, both as described more completely below. In a preferred embodiment, the second surface 128 of the first compression seat 122 has a chamfer 130 disposed at the edge of the open aperture 124. The chamfer 130 receives the curved back portion of the ball fitting 18a, in a manner as described at length above in regard to the coupling 10.

A second compression seat 132 is preferably also disposed within the second section of the open main aperture 114b. The second compression seat 132 as depicted fills most of the second section of the open main aperture 114b. However, as described above in regard to the first compression seat 122, this is not necessarily a requirement, and the size of the second compression seat 132 is determined by the size of the ball and socket joint that it is intended to engage, as described more completely below.

The second compression seat 132 forms an open aperture 134 having a diameter that is smaller than the diameter of the socket fitting 18b and larger than the diameter of the second tubing 16b. The open aperture 134 receives the second tubing 16b through the second compression seat 132. For this reason, the diameter of the second compression seat 132 must be at least somewhat larger than the diameter of the second tubing 16b. This required size of the second compression seat 132 further requires that the diameter of the second section of the open main aperture 114b also be at least this large.

A first surface 136 of the second compression seat 132 is aligned toward the second end 118 of the unified coupling body 112 and a second surface 138 is aligned toward the middle of the unified coupling body 112. The first surface 136 of the second compression seat 132 receives axial pressure from the second end of the unified coupling body 112, and the second surface 138 of the second compression seat 132 applies axial pressure to the back of the socket fitting 18b, as described more completely below. In a preferred embodiment, the second surface 138 of the first compression seat 132 has a chamfer 140 disposed at the edge of the open aperture 134. The chamfer 140 receives the curved back portion of the socket fitting 18b, in a manner as described at length above in regard to the coupling 10.

Both the first compression seat 122 and the second compression seat 132 may be formed of a variety of materials, which are selected according to criteria similar to those discussed for the construction of the first ring and the second ring, described above. As was also mentioned above in regard to the construction of the first ring and the second ring, the first compression seat 122 and the second compression seat 132 may be formed of different materials, and need not be formed of the same materials. In a preferred embodiment, the first compression seat 122 and the second compression seat 132 are made of Teflon.

Pressure adjustment means 142, 144 create axial pressure between the first end 116 of the unified coupling body 112 and the first surface 126 of the first compression seat 122. One end of the pins 142 are disposed outside of the unified coupling body 112, and are thus accessible for manipulation in a manner as described below. The other end of the pins 142 are disposed within the second section of the open main aperture 114b within the unified coupling body 112. These internal ends of the pins 142 contact the first compression seat 122, such as within wells 146 as depicted in FIG. 5.

The pins 142 provide at least a means for maintaining alignment of the first compression seat 122 relative to the unified coupling body 112, and a means for selectively retracting the first compression seat 122 through the second section of the open main aperture 114b toward the first end 116 of the unified coupling body 112. Additionally, in some embodiments, as described below, the pins 142 are used to selectively increase and decrease the axial pressure between the first end 116 of the unified coupling body 112 and the first surface 126 of the first compression seat 122.

As depicted in FIGS. 5 and 6, the compression means may work in a variety of different ways. For example, pins 142 may have threads that engage threads 148 within the first end 116 of the unified coupling body 112. In this embodiment, the pins 142 may be reversibly rotated relative to the unified coupling body 112, thus causing the first compression seat 122 to selectively travel toward or away from the first end 116 of the unified coupling body 112. This selectively reversible travel of the first compression seat 122 exerts axial pressure on a ball and socket joint disposed between the first compression seat 122 and the second compression seat 132. In this embodiment, the springs 144 may not be required.

In another embodiment, springs 144 provide the compression between the first end 116 of the unified coupling body 112 and the first compression seat 122. In this embodiment the pins 142 are not threaded, but are used to retract the first compression seat 122 toward the first end 116 of the unified coupling body 112, and align the first compression seat 122 relative to the unified coupling body 112. In yet another embodiment, the pins 142 are threaded and are used to position the first compression seat 122 within the unified coupling body 112, and both the pins 142 and the springs 144 provide compression between the first end 116 of the unified coupling body 112 and the first surface 126 of the first compression seat 122.

The coupling 110 operates by retracting the first compression seat 122 through the second section of the open main aperture 114b toward the first end 116 of the unified coupling body 112, and placing the entire coupling 110 over an assembled ball and socket joint. The ball and socket joint is received into the unified coupling body 112 through the open access aperture 120, and is received between the first compression seat 122 and the second compression seat 132.

The first tubing 16a, which extends outward from the ball fitting 18a, and the second tubing 16b, which extends outward from the socket fitting 18b, are received into the unified coupling body 112 through the first section of the open main aperture 114a and the third section of the open main aperture 114c, respectively. The first tubing 16a and the second tubing 16b are also received into the first compression seat 122 and the second compression seat 132 via the open aperture 124 in the first compression seat 122 and the open aperture 134 in the second compression seat 132, respectively.

Because the open access aperture 120 and the second section of the open main aperture 114b have diameters that are larger than the diameters of the ball fitting 18a and the socket fitting 18b, and the open aperture 124 of the first compression seat 122 and the open aperture 134 of the second compression seat 132 have diameters that are smaller than the diameters of the ball fitting 18a and the socket fitting 18b, the second surface 128 of the first compression seat 122 and the second surface 138 of the second compression seat 132 engage the backs of the ball fitting 18a and the socket fitting 18b, respectively, when the compression means 142, 144 create compression between the first end 116 of the unified coupling body 112 and the first surface 126 of the first compression seat 122.

Further, because the first compression seat 122 and the second compression seat 132 are preferably formed of materials that can deform slightly under compression, and additionally because the compression is generated in more than one location by the compression means 142, 144, the axial pressure applied by the coupling 110 to the ball and socket joint tends to be a more uniform axial pressure than that provided by prior art couplings. The rigidity of the unified coupling body 112, and the fact that the first compression seat 122 and the second compression seat 132, which are the elements in contact with the ball and socket fitting, are separate elements, also tend to function cooperatively to provide a more uniform axial pressure.

Figure 8:
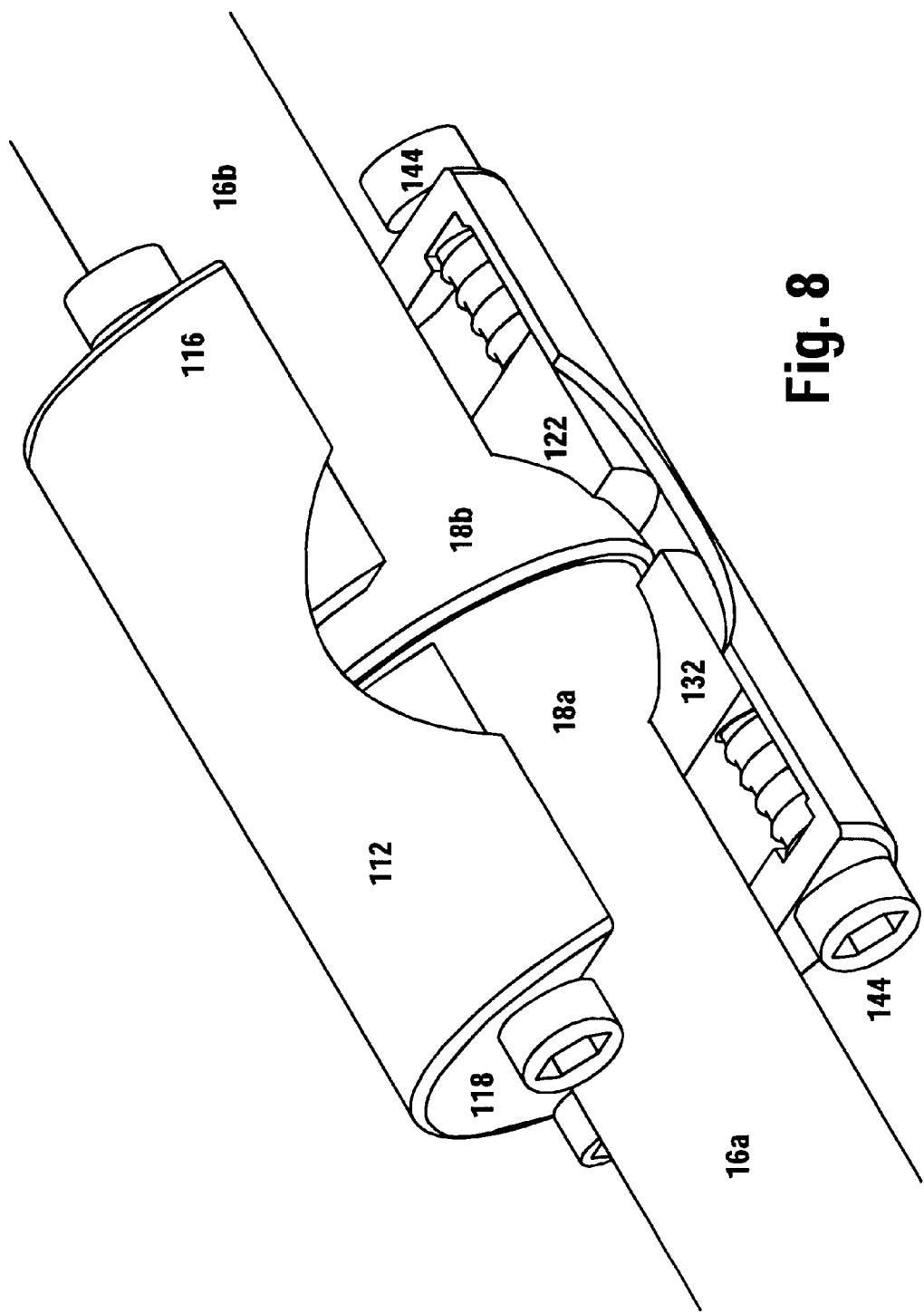
FIG. 8 depicts a perspective view of the second embodiment of the invention.

FIG. 8 depicts a perspective view of the coupling 110, including the unified coupling body 112 holding two tubings 16a and 16b together in a joint comprising ball 18a and socket 18b. Thus, FIG. 8 depicts how the coupling 110 holds the joint together. In the embodiment of FIG. 8, both the first compression seat 122 and the second compression seat 132 are connected to compression means 144.

Figure 7:
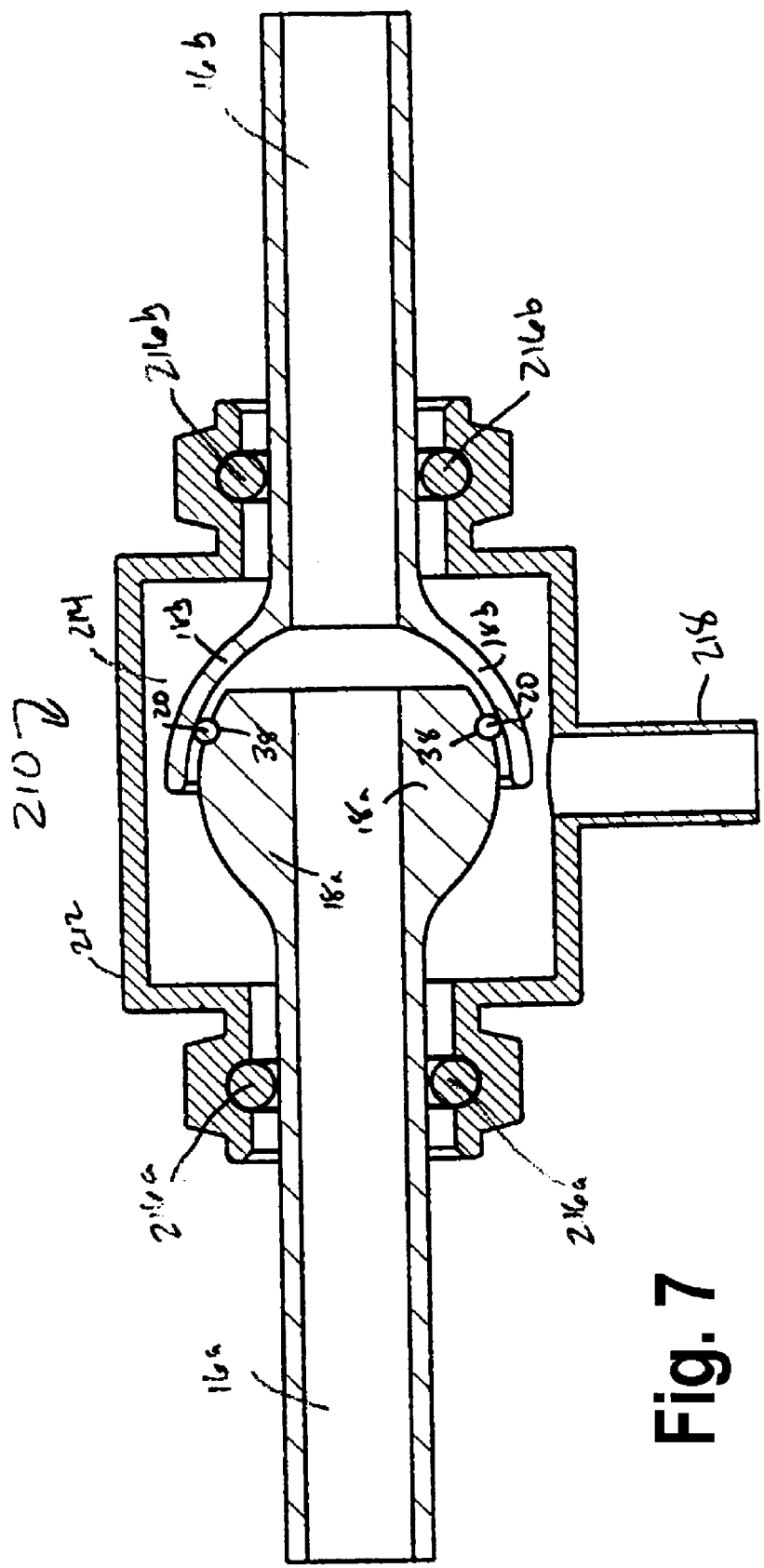
FIG. 7 depicts a cross-sectional side view of a third embodiment of the invention.

FIG. 7 depicts a third embodiment of a coupling 210 according to the present invention. The coupling 210 maintains a controlled environment around the ball and socket joint, in addition to applying uniform axial pressure to the joint. A main housing 212 is disposed around the ball and socket joint. The main housing 212 is preferably formed of at least two component pieces, because it is assembled onto the ball and socket joint after the joint is assembled. The coupling 210 is preferably formed of the same materials, selected according to the same criteria, as discussed above for couplings 10 and 110.

The main housing 212 forms a control chamber 214 that has a minimum diameter that is larger than the diameter of the first tubing 16a, the ball fitting 18a, the socket fitting 18b, and the second tubing 16b. In this manner, the main housing 212 is able to contain portions of the first tubing 16a, the ball fitting 18a, the socket fitting 18b, and portions of the second tubing 16b within the control chamber 214.

A first tractable seal 216a is formed at one end of the main housing 212, and creates a seal between the first tubing 16a and the main housing 212. The first tractable seal 216a forms an aperture that is larger than the diameter of the first tubing 16a, and smaller than the diameter of the ball fitting 18a. Preferably, the diameter of the aperture of the first tractable seal 216a is such that it physically contacts either the first tubing 16a, or the back portion of the ball fitting 18a, in order to create the hermetic seal. In this manner it may be more convenient to consider that the diameter of the aperture of the first tractable seal 216a is the same as the diameter of the first tubing 16a.

By tractable it is meant that there is sufficient pressure between the tractable seal 216a and the first tubing 16a that, when a force acts to displace the first tubing 16a relative to the main housing 212 through the tractable seal 216a, sufficient friction exists between the first tubing 16a and the tractable seal 216a to resist the force, which tends to keep the first tubing 16a from axially displacing relative to the main housing 212. In this manner, as explained more completely below, any compression that is applied to the ball and socket joint during assembly of the coupling 210 will tend to remain within the coupling 212, and not be alleviated by the first tubing 16a translating through the tractable seal 216a.

The first tractable seal 216a is preferably a KF type fitting, such as a KF-25 that would fit around a nominal one inch diameter first tubing 16a. However, other o-ring type seals would also be appropriate, or other seals that do not include o-rings at all. In the preferred embodiment, the first tractable seal 216a creates a hermetic seal between the first tubing 16a and the main housing 212. In one embodiment this is accomplished by welding the KF-25 fitting to at least one portion of the main housing 212, and providing gaskets between the KF-25 fitting the rest of the pieces that are used to form the main housing. In yet another embodiment, the coupling 210 is permanently welded around the joint.

A second tractable seal 216b is formed at the other end of the main housing 212 opposite from the first tractable seal 216a, and creates a seal between the second tubing 16b and the main housing 212. The second tractable seal 216b forms an aperture that is larger than the diameter of the second tubing 16b, and smaller than the diameter of the socket fitting 18b. Preferably, the diameter of the aperture of the second tractable seal 216b is such that it physically contacts either the second tubing 16b, or the back portion of the socket fitting 18b, in order to create a hermetic seal. In this manner it may be more convenient to consider that the diameter of the aperture of the second tractable seal 216b is the same as the diameter of the second tubing 16b.

As described above, when a force acts to displace the tubing 16b relative to the main housing 212 through the tractable seal 216b, sufficient friction exists between the second tubing 16b and the tractable seal 216b to resist the force, which tends to keep the second tubing 16b from axially displacing relative to the main housing 212. In this manner, as explained more completely below, any compression that is applied to the ball and socket joint during assembly of the coupling 210 will tend to remain within the coupling 212, and not be alleviated by the second tubing 16b translating through the tractable seal 216b.

The second tractable seal 216b is also preferably a KF type fitting, such as a KF-25 that would fit around a nominal one inch diameter second tubing 16b. However, other o-ring type seals would also be appropriate, or other seals that do not include o-rings at all. In the preferred embodiment, the second tractable seal 216b creates a hermetic seal between the second tubing 16b and the main housing 212. In one embodiment this is accomplished by welding the KF-25 fitting to at least one portion of the main housing 212, and providing gaskets between the KF-25 fitting the rest of the pieces that are used to form the main housing. In yet another embodiment, the coupling 210 is permanently welded around the joint.

The main housing 212, first tractable seal 216a, and second tractable seal 216b form an enclosure around the ball fitting 18a and the socket fitting 18b, which creates a controlled environment within the control chamber 214. In a preferred embodiment, all of the seals and other elements described above create a hermetic enclosure around the ball fitting 18a and the socket fitting 18b.

In another preferred embodiment, a pipe portion 218 is disposed on the main housing 212, and forms a port into the control chamber 214. The pipe portion 218 can then be used to provide the controlled environment with the control chamber 214. For example, an inert gas could be provided to the control chamber 214 through the pipe portion 218. In this manner, oxygen or moisture could be purged from the control chamber 214, which would in turn prevent any oxygen or moisture from entering the joint within the control chamber 214.

In other embodiments, different fluids could be introduced through the pipe portion 218 and into the control chamber 214. It may be desirable to draw a vacuum within the control chamber 214 through the pipe portion 218. In this manner, the chances of anything penetrating the joint from the outside of the joint to the inside of the joint is dramatically reduced. Further, this embodiment would tend to provide a level of safety for joints that are used to conduct corrosive or poisonous materials, as they could be drawn off with the vacuum to a more controlled location for further processing and neutralizing.

In yet another embodiment, the same fluid that is flowing through the joint is introduced through the pipe portion 218 into the control chamber 214. In this embodiment there is no danger of contaminating the fluid within the joint, regardless of whether the joint leaks from the outside in or the inside out.

It will be appreciated that the invention as described above comprehends various adaptation, rearrangement, and substitution of parts, all of which are considered to be within the scope and spirit of the invention as described, and that the scope of the invention is only to be restricted by the language of the claims given below.

What is claimed is:

1. A system for coupling a ball fitting having a diameter to a socket fitting having a diameter, where the ball fitting is connected to a first tubing having a diameter and the socket fitting is connected to a second tubing having a diameter, the system comprising:

a first coupling piece,
the first coupling piece forming an aperture having a diameter that is larger than the diameter of the ball fitting and the diameter of the first tubing, the aperture of the first coupling piece for receiving the ball fitting and the first tubing through the first coupling piece,
the first coupling piece also forming an annular race disposed concentric with and outside of the aperture in the first coupling piece, and
the first coupling piece having an annular surface disposed concentric with and between the annular race of the first coupling piece and the aperture of the first coupling piece, first split ring pieces for assembling into a first ring,
  the first ring forming an aperture having a diameter that is smaller than the diameter of the ball fitting and larger than the diameter of the first tubing, the aperture of the first ring for receiving the first tubing through the first ring, and
  the first ring also forming an annular ridge disposed concentric with and outside of the aperture in the first ring, the annular ridge for engaging the annular race of the first coupling piece, the annular race of the first coupling piece for assisting in aligning and holding the first split ring pieces together in the first ring,
  the first ring further forming a first surface disposed concentric with and between the annular ridge of the first ring and the aperture of the first ring,
the annular surface of the first coupling piece for applying uniform axial pressure to the first surface of the first ring,
the first ring having a second surface opposing the first surface and disposed concentric with and outside of the aperture of the first ring, the second surface for applying uniform axial pressure to a back portion of the ball fitting,
a second coupling piece,
  the second coupling piece forming an aperture having a diameter that is larger than the diameter of the socket fitting and the diameter of the second tubing, the aperture of the second coupling piece for receiving the socket fitting and the second tubing through the second coupling piece,
  the second coupling piece also forming an annular race disposed concentric with and outside of the aperture in the second coupling piece, and
  the second coupling piece having an annular surface disposed concentric with and between the annular race of the second coupling piece and the aperture of the second coupling piece,
second split ring pieces for assembling into a second ring,
  the second ring forming an aperture having a diameter that is smaller than the diameter of the socket fitting and larger than the diameter of the second tubing, the aperture of the second ring for receiving the second tubing through the second ring, and
  the second ring also forming an annular ridge disposed concentric with and outside of the aperture in the second ring, the annular ridge for engaging the annular race of the second coupling piece, the annular race of the second coupling piece for assisting in aligning and holding the second split ring pieces together in the second ring,
  the second ring further forming a first surface disposed concentric with and between the annular ridge of the second ring and the aperture of the second ring,
the annular surface of the second coupling piece for applying uniform axial pressure to the first surface of the second ring,
the second ring having a second surface opposing the first surface and disposed concentric with and outside of the aperture of the second ring, the second surface for applying uniform axial pressure to a back portion of the socket fitting, and
engagement means for reversibly drawing the first coupling piece and the second coupling piece toward each other and for releasably holding the first coupling piece and the second coupling piece together with uniform axial pressure.

2. The system of claim 1 wherein the engagement means further comprise a threaded portion on an inside surface of the first coupling piece and a threaded portion on an outside surface of the second coupling piece, the threaded portion of the first coupling piece for engaging the threaded portion on the second coupling piece, and for reversibly drawing the first coupling piece and the second coupling piece toward each other and for releasably holding the first coupling piece and the second coupling piece together with uniform axial pressure when the first coupling piece is axially rotated relative to the second coupling piece.

3. The system of claim 1 wherein the engagement means further comprise:
  the first coupling piece forming holes that are uniformly spaced around a circumference of the first coupling piece, the holes in the first coupling piece disposed parallel to the aperture of the first coupling piece,
  the second coupling piece forming holes that are uniformly spaced around a circumference of the second coupling piece, the holes in the second coupling piece disposed parallel to the aperture of the second coupling piece,
  fastening pins having a length sufficient to extend through the holes of the first coupling piece and through the holes of the second coupling piece, each of the fastening pins having a retaining surface on one end of the fastening pin for engaging and retaining the first coupling piece, and
  retainers for engaging the ends of the fastening pins that do not have the retaining surface, for engaging and retaining the second coupling piece, and for reversibly drawing the first coupling piece and the second coupling piece toward each other and for releasably holding the first coupling piece and the second coupling piece together with uniform axial pressure.

4. The system of claim 1 wherein both the first coupling piece and the second coupling piece are made of stainless steel.

5. The system of claim 1 wherein both the first split ring pieces and the second split ring pieces are made of Teflon.

6. The system of claim 1 wherein both the first split ring pieces and the second split ring pieces each comprise a set of two pieces.

7. The system of claim 1 further comprising:
  the second surface of the first ring having a chamfer adapted to receive a curved portion on the back portion of the ball fitting, and
  the second surface of the second ring having a chamfer adapted to receive a curved portion on the back portion of the ball fitting.

8. A system for coupling a ball fitting having a diameter to a socket fitting having a diameter, where the ball fitting is connected to a first tubing having a diameter and the socket fitting is connected to a second tubing having a diameter, the system comprising:
  a unified coupling body,
    the unified coupling body forming an open main aperture having a first section, a second section, and a third section,
      the first section of the main aperture of the unified coupling body disposed adjacent a first end of the unified coupling body, and having a diameter that is smaller than the diameter of the ball fitting and larger than the diameter of the first tubing, the first section of the main aperture of the unified coupling body for receiving the first tubing into the unified coupling body, the second section of the main aperture of the unified coupling body disposed adjacent the first section of the main aperture of the unified coupling body in a middle portion of the unified coupling body, and having a diameter that is larger than the diameter of the first tubing, larger than the diameter of the ball fitting, larger than the diameter of the socket fitting, and larger than the diameter of the second tubing, the second section of the main aperture of the unified coupling body for receiving the first tubing, the ball fitting, the socket fitting, and the second tubing into the unified coupling body, the third section of the main aperture of the unified coupling body disposed adjacent the second section of the main aperture of the unified coupling body and adjacent a second end of the unified coupling body, and having a diameter that is smaller than the diameter of the socket fitting and larger than the diameter of the second tubing, the third section of the main aperture of the unified coupling body for receiving the second tubing into the unified coupling body, and the unified coupling body also forming an open access aperture disposed adjacent the second section of the main aperture of the unified coupling body in the middle portion of the unified coupling body, and having a diameter that is larger than the diameter of the first tubing, larger than the diameter of the ball fitting, larger than the diameter of the socket fitting, and larger than the diameter of the second tubing, the access aperture of the unified coupling body for receiving the first tubing, the ball fitting, the socket fitting, and the second tubing into the second section of the main aperture of the unified coupling body, a first compression seat, the first compression seat forming an open aperture having a diameter that is smaller than the diameter of the ball fitting and larger than the diameter of the first tubing, the aperture of the first compression seat for receiving the first tubing through the first compression seat, the first compression seat having a first surface, and the first compression seat also having a second surface opposing the first surface and disposed concentric with and outside of the aperture of the first compression seat, the second surface of the first compression seat for applying axial pressure to a back portion of the ball fitting, and compression means disposed between the first end of the unified coupling body and the first surface of the first compression seat, the compression means for creating axial pressure between the first end of the unified coupling body and the first surface of the first compression seat.

9. The system of claim 8 further comprising a second compression seat, the second compression seat forming an open aperture having a diameter that is smaller than the diameter of the socket fitting and larger than the diameter of the second tubing, the aperture of the second compression seat for receiving the second tubing through the second compression seat, the second compression seat having a first surface disposed adjacent the second end of the unified coupling body, the first surface of the second compression seat for receiving axial pressure from the second end of the unified coupling body, and the second compression seat also having a second surface opposing the first surface and disposed concentric with and outside of the aperture of the second compression seat, the second surface of the second compression seat for applying axial pressure to a back portion of the socket fitting.

10. The system of claim 8 further comprising pressure adjustment means for selectively increasing and decreasing the axial pressure created by the compression means between the first end of the unified coupling body and the first surface of the first compression seat.

11. The system of claim 8 wherein the compression means and the pressure adjustment means further comprise screws that engage the first end of the unified coupling body in a threaded fashion.

12. The system of claim 8 wherein the compression means further comprise at least one spring disposed between the first end of the unified coupling body and the first surface of the first compression seat.

13. The system of claim 8 further comprising retraction means for selectively retracting the first surface of the first compression seat through the second section of the main aperture of the unified coupling body and toward the first end of the unified coupling body.

14. The system of claim 8 wherein the unified coupling body is made of stainless steel.

15. The system of claim 9 wherein both the first compression seat and the second compression seat are made of Teflon.

16. The system of claim 9 further comprising:

the second surface of the first compression seat having a chamfer adapted to receive a curved portion on the back portion of the ball fitting, and the second surface of the second compression seat having a chamfer adapted to receive a curved portion on the back portion of the ball fitting.

17. A system for maintaining a controlled environment around a joint having a ball fitting having a diameter and a socket fitting having a diameter, where the ball fitting is connected to a first tubing having a diameter and the socket fitting is connected to a second tubing having a diameter, the system comprising:

a main housing, the main housing formed of at least two component pieces detachably assembled together, and the main housing forming a control chamber having a minimum diameter that is larger than the diameter of the first tubing, larger than the diameter of the ball fitting, larger than the diameter of the socket fitting, and larger than the diameter of the second tubing, a first tractable seal, the first tractable seal forming an aperture having a diameter that is larger than the diameter of the first tubing and smaller than the diameter of the ball fitting, the first tractable seal for creating a seal between the first tubing and the main housing, and the first tractable seal further for keeping the first tubing and the ball fitting from axially translating relative to the main housing, a second tractable seal, the second tractable seal forming an aperture having a diameter that is larger than the diameter of the second tubing and smaller than the diameter of the socket fitting, the second tractable seal for creating a seal between the second tubing and the main housing, and the second tractable seal further for keeping the second tubing and the socket fitting from axially translating relative to the main housing, and the main housing, first tractable seal, and second tractable seal forming an enclosure around the ball fitting and the socket fitting.

18. The system of claim 17 wherein the first tractable seal creates a hermetic seal between the first tubing and the main housing, the second tractable seal creates a hermetic seal between the second tubing and the main housing, and the enclosure around the ball fitting and the socket fitting is a hermetic enclosure.

19. The system of claim 18 further comprising a pipe portion disposed on the main housing and forming a port into the hermetic enclosure for providing the controlled environment within the control chamber.

20. A system for maintaining a controlled environment around a joint having a ball fitting having a diameter and a socket fitting having a diameter, where the ball fitting is connected to a first tubing having a diameter and the socket fitting is connected to a second tubing having a diameter, the system comprising:

a main housing, the main housing formed of at least two component pieces detachably assembled together, and the main housing forming a control chamber having a minimum diameter that is larger than the diameter of the first tubing, larger than the diameter of the ball fitting, larger than the diameter of the socket fitting, and larger than the diameter of the second tubing, a first tractable seal, the first tractable seal forming an aperture having a diameter that is larger than the diameter of the first tubing and smaller than the diameter of the ball fitting, the first tractable seal for creating a hermetic seal between the first tubing and the main housing, and the first tractable seal further for keeping the first tubing and the ball fitting from axially translating relative to the main housing, a second tractable seal, the second tractable seal forming an aperture having a diameter that is larger than the diameter of the second tubing and smaller than the diameter of the socket fitting, the second tractable seal for creating a hermetic seal between the second tubing and the main housing, and the second tractable seal further for keeping the second tubing and the socket fitting from axially translating relative to the main housing, the main housing, first tractable seal, and second tractable seal forming a hermetic enclosure around the ball fitting and the socket fitting, and a pipe portion disposed on the main housing and forming a port into the hermetic enclosure for providing the controlled environment within the control chamber, wherein the controlled environment is one of an inert gas introduced through the pipe portion, a vacuum drawn through the pipe portion, and a fluid selected to be identical to a fluid flowing within the first tubing, the ball fitting, the socket fitting, and the second tubing.

* * * * *